UNITED STATES PATENT OFFICE 2,538,883

PHENOL-MODIFIED ACETONE RESINS

Conrad F. Schrimpe, Woodbridge, N. J., assignor, by mesne assignments, to Union Carbide and Carbon Corporation, a corporation of New York No Drawing. Application July 18, 1947, Serial No. 761,989

5 Claims. (Cl. 260—43)

This invention relates to the condensation of acetone and formaldehyde for the purpose primarily of yielding thermosetting resinous products.

In the preparation of products that can be heat-hardened to the infusible state, it has been found that the upper limit of formaldehyde to acetone ratio is practically two moles to one mole; higher formaldehyde ratios in the reaction mass lead to water-soluble products that can be rendered insoluble or infusible but with difficulty and they yield inferior products. The condensation, moreover, is not one that goes to completion but reaches an equilibrium having present unreacted formaldehyde and acetone and methylol groups apparently attached to acetone residues in a chain structure of alternate acetone residues and connecting methylene groups; the presence of unreacted formaldehyde and excess methylol groups in the hardened product, however, impair its properties, and it has been found that they can best be minimized by condensing equimolecular proportions of formaldehyde and acetone with a recovery of about 45 per cent of unreacted acetone upon subsequent dehydration.

It has been further found that, in order to obtain a thermo-setting spirit-soluble type of product required for laminating or bonding uses, the pH value must be maintained to at least about 9.5–10.5; when it drops materially below this value, fusible water-soluble products appear to predominate. The preferred upper limiting value is about 11.5, for at higher pH values there is a tendency for the reaction to continue to a useless rubbery mass. Basic condensing catalysts accordingly are required, and water-soluble inorganic bases comprising the hydroxides of the strongly-positive light metals, such as the alkali and the alkali earth metals, are operable for creating the pH values; but the alkali (sodium and potassium) hydroxides are preferred because they are readily available and inexpensive. These caustics so strongly catalyze the condensation at the beginning that reaction control is difficult, but they very quickly lose their effectiveness due to the sensitivity of formaldehyde to the Cannizzaro reaction; and they must be repeatedly replenished for the condensation to continue at the required pH value.

Unexpectedly it has now been found that phenol particularly and alkyl- and aryl-substituted monohydric phenols as well can serve to maintain and even to improve the pH value on standing of an inorganic base-catalyzed solution of acetone and formaldehyde by their presence in the reaction mass. The phenol evidently acts as a buffering agent that represses the Cannizzaro reaction, and it obviates the necessity of repeatedly restoring the pH during the course of the reaction by additions of condensing agent.

Some repression or buffering action is noticeable with as low as 2 to 5 per cent by weight of a phenol based on the acetone, when equimolecular proportions of acetone and formaldehyde are present, or about 4 to 10 per cent based on the weight of formaldehyde as such. But when the proportion is increased to 10 per cent by a phenol on the weight of acetone, the pH established by the inorganic base is not only held during the condensation but improves on standing. Accordingly then it is only necessary to include initially an amount of inorganic base that gives a pH of about 9.5–10.5 and about 10 per cent or more of phenol on the weight of acetone, when equimolecular portions of formaldehyde and acetone are used, in order to insure the directing of the reaction toward the thermosetting type of product that is spirit-soluble.

When the ratio of formaldehyde to acetone in the initial mix is increased to two moles to one of acetone, further additions of phenol or equivalent are found necessary to preserve the pH; this is found to be about 35 per cent of phenol based on the weight of acetone (or formaldehyde). The added formaldehyde evidentally favors the Cannizzaro reaction with the inorganic base and the consequent destruction of formaldehyde into alcohol and acid.

Since the light metal hydroxides are strongly basic, the percentage addition necessary to establish a pH of about 10 or more in order to direct the resin-forming condensation is very small. It varies with the relative ratio of formaldehyde and the amount of buffer included. But on the total weight of reactants, including the buffer, from one to two per cent is generally ample.

The condensation is an exothermic reaction that is allowed to proceed by standing; for control, cooling is applied to hold the temperature below the boiling point of the acetone. When the reaction ceases, the mass is distilled atmospherically to about 80° C. to drive off the unreacted acetone, and then it is dehydrated under vacuum. The catalyst that remains in the mass renders it heat-reactive but a hardening catalyst, as diethylenetriamine, can be added. In this condition the product can be used as a substitute for a straight reactive phenol-formaldehyde resin, and its outstanding utility has been found in the field of laminating varnishes primarily on account of its superiority to the usual resins made from phenol and cresol in caustic resistance and in the lack of distortion of laminated core stock bonded by it when subject to water absorption. Essential to both condensation and hardening is the basic condition of the mass at a pH value in the range preferably of about 9.5 to 11.5; acids must be avoided as detrimental.

The following examples illustrate the invention without limiting it thereto.

Example 1

There was mixed (1:1 molar proportion)
3480 grams acetone
4800 grams aqueous formaldehyde (37%)
348 grams phenol
50 grams caustic soda in
50 cc. water.

The initial pH was 10.4, and the reaction was allowed to proceed by standing with some cooling of the reaction vessel to control the temperature; in the course of the reaction the pH rose to 10.9. The mass was refluxed and distilled atmospherically to 80° C., and 1638 grams of unreacted acetone was collected; dehydration was continued under 28 inch vacuum until the temperature reached 85° C. The yield was 3085 grams of a very viscous heat-reactive resin which was soluble in alcohol but insoluble in water. The solution in alcohol made a satisfactory laminating varnish.

Example 2

A reaction vessel was charged with (1:2 molar proportion)
1972 grams acetone
6080 grams aqueous formaldehyde (37%)
690 grams phenol
75 grams caustic soda in
50 cc. water.

The pH at the start was 10.26; and, as the reaction proceeded on standing with cooling for control, the pH dropped somewhat to 10.1. When the condensation ceased, the mass was refluxed and distilled atmospherically to 80° C. to collect 275 grams of unreacted acetone. Distillation was continued under 28 inch vacuum to remove the water until a temperature of 85° C. was reached. The yield was 3700 grams of a viscous reddish brown resin, insoluble in water but soluble in alcohol and heat-reactive.

Example 3

A caustic solution was prepared by dissolving 50 grams of NaOH in 500 grams of 37 per cent aqueous formaldehyde. Three cc. of this solution were added to a mixture of 1570 grams aqueous formaldehyde (37%) and 435 grams acetone and on standing a reaction set in that soon terminated. But when there was then admixed 15 cc. of the caustic solution and 750 grams phenol, the pH was maintained to permit completion of the condensation refluxing for 2 hours and vacuum-dehydrating to yield a dark ambered colored resin that baked to a hard infusible resin.

In the foregoing examples alkyl- and aryl-substituted monohydric phenols, such as the cresols, xylenols and p-phenyl-phenol having open one or more of the active nuclear positions (ortho and para to the phenolic hydroxyl), in equivalent weights have the same effectiveness in maintaining the pH. Formaldehyde in the aqueous form is most convenient for use, but the anhydrous polymers, such as paraformaldehyde, are full equivalents. Also other light metal bases give the same catalytic action as caustic soda or caustic potash.

The preparation of resin set out in the foregoing is dependent on the action of phenol, or alkyl- or aryl-substituted phenol, as a buffering agent. Greater amounts of the phenol than required for buffering can be included, and also there can be present initially, or added subsequent to the acetone-formaldehyde condensation, amounts of formaldehyde for reaction with the excess phenol to yield a phenol-formaldehyde resin in admixture with the acetone-formaldehyde resin; the formaldehyde addition above that for the acetone reaction is preferably in the ratio of about one mole to one mole of the phenol that is present in excess of that required for preserving the pH. The object of the invention is accomplished when sufficient phenol is present as such during the condensation of acetone and formaldehyde to supply the buffering action for maintaining the pH at the required value with caustic alkali as the catalytic agent; the basicity of the catalyst also serves to promote a phenol-formaldehyde condensation to a heat-reactive type of resin and its hardening upon heating. More of the base can be added to increase the hardening speed, but the preferred basic hardening agents so added are the high-boiling organic amines, diamines and triamines, of which piperidine, piperazine, guanidine and diethylene-triamine are representative.

The acetone-formaldehyde condensation product, prepared with a phenol buffer in accordance with this invention, can also be admixed with a base-catalyzed heat-hardening condensation product of phenol and formaldehyde; such a mixture heat-hardens into a homogeneous product, when it has a pH of no less than 9, and preferably 9.5 to 10.5, at the time of hardening.

For the preparation of laminated, an alcoholic solution of the resin is applied as a varnish to the surface of paper, wood veneer, cloth, etc., and the solvent alcohol is evaporated to leave a coating or impregnation of the resin. The treated sheets are assembled into a stack and then subjected to the customary conditions of heat and pressure, i. e. at 135° C. and 500–1000 pounds pressure, for a period to convert the resin to the hardened infusible state. Laminated core stock thus prepared from paper impregnated with an alcohol solution of the resin of Example 1 (37% resin content in paper) showed upon immersion in water for 96 hours an absorption of 1.95 per cent by weight.

What is claimed is:

1. Process which comprises condensing a reaction mixture consisting of a mole of acetone and from one to two moles of formaldehyde as the essential reactive ingredients in the presence of an inorganic base establishing a pH between 9.5 and 11.5 and of about 10 to 35 per cent on the weight of the acetone of a monohydric phenol from the group consisting of phenol, cresols, xylenols and p-phenyl-phenol.

2. Product comprising the alcohol soluble and water-insoluble condensation product consisting of a mole of acetone and from one to two moles of formaldehyde catalyzed by an inorganic base at a pH between 9.5 and 11.5 and buffered, in the condensation by from 2 to 35 per cent on the weight of the acetone of a monohydric phenol from the group consisting of phenol, cresols, xylenols and p-phenyl-phenol.

3. Process which consists in condensing a reaction mixture consisting of a mole of acetone and from one to two moles of formaldehyde in the presence of an inorganic base establishing a pH of the mixture between 9.5 and 11.5 and of about 2 to 35 per cent on the weight of the acetone of a monohydric phenol selected from the group consisting of phenol, cresols, xylenols and p-phenyl phenol to form an alcohol-soluble resin, mixing said resin with a base-catalyzed heat-hardening condensation product of phenol and formaldehyde, and adjusting the pH of the mixture to between 9 and 10.5 for heat-hardening into a homogeneous product.

4. Process which comprises condensing a reaction mixture consisting of a mole of acetone and from one to two moles of formaldehyde in the presence of an inorganic base establishing a pH of the mixture between 9.5 and 11.5 and of a quantity of a monohydric phenol selected from the group consisting of phenol, cresols, xylenols and p-phenyl phenol in excess of that required for buffering the reaction mixture at the aforesaid pH range, and a further quantity of formaldehyde in amount for reacting in a ratio one mole per mole of phenol in excess of a buffering amount.

5. The product of claim 2 in admixture with a base-catalyzed heat-hardening condensation product of phenol and formaldehyde, said mixture having a pH between 9.5 and 10.5 for heat-hardening.

CONRAD F. SCHRIMPE.

REFERENCES CITED

The following references are of record in the file of this patent:

UNITED STATES PATENTS

| Number | Name | Date |
|---|---|---|
| 2,205,427 | Loos | June 25, 1940 |
| 2,206,906 | Loos | July 9, 1940 |

Certificate of Correction

January 23, 1951

Patent No. 2,538,883

CONRAD F. SCHRIMPE

It is hereby certified that error appears in the printed specification of the above numbered patent requiring correction as follows:

Column 3, line 66, before the word "refluxing" insert *by*; column 4, line 72, strike out "two"; and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*